2,858,316
NEW PIPERIDINE DERIVATIVES

Henri Morren, Brussels, Belgium, assignor to Union Chimique Belge, S. A., Brussels, Belgium, a corporation of Belgium No Drawing. Application August 19, 1957
Serial No. 679,068

Claims priority, application Belgium November 16, 1956

3 Claims. (Cl. 260—294.3)

The analgesic properties of morphine and of 1-methyl-4-phenyl-4-carbethoxy-piperidine, currently called "Pethidine" are known.

Products similar to Pethidine have been synthesized with the purpose of obtaining more powerful analgesics. Thus, O. J. Braenden, N. B. Eddy and H. Halbach (Bull. World Health Org. 13 (1955), 937–98) and N. B. Eddy (J. Org. Chem. 21 (1956), 125–26) refer to substances conforming to the general formula:

$$\underset{ROOC}{\overset{C_6H_5}{\diagdown}}\underset{CH_2CH_2}{\overset{CH_2CH_2}{\diagup}}C\underset{CH_2CH_2}{\overset{}{\diagdown}}N-R' \quad (I)$$

wherein R represents a lower alkyl radical, and R' is selected from the group consisting of a hydrogen atom and ethyl, propyl, alkyl, cyclohexyl, 2-hydroxyethyl, amino, 2-(diethylamino)-ethyl and 2-hydroxy-3-phenyl-propyl radicals.

However, none of these compounds has greater analgesic power than Pethidine. On the contrary, a lower activity is observed.

On the other hand, J. Weijlard et al. (J. Am. Chem. Soc. 78 (1956), 2342–43) have prepared a product conforming to the aforesaid formula with R' representing the radical 2-(p-aminophenyl)-ethyl. They have found that this product possesses a greater analgesic activity than Pethidine, approaching that of morphine in the experiments on animals.

Finally, F. Elpern et al. (Abstr. Papers, 130th Meeting of Am. Chem. Soc., September 1956, 7N, No. 11) have synthesized compounds conforming to the general Formula I, in which R' represents one of the following radicals: phenylethyl, phenylpropyl, phenylbutyl, substituted phenylethyl, pyridylethyl, cinnamyl, etc.

Some of these products have a greater analgesic power than Pethidine, notably in the case where R' represents the cinnamyl radical.

The present invention relates to new piperidine derivatives, substituted on the nitrogen by an aliphatic radical containing at least one hydroxylated ether function. They have the general formula $$\underset{ROOC}{\overset{C_6H_5}{\diagdown}}\underset{CH_2CH_2}{\overset{CH_2CH_2}{\diagup}}C\underset{CH_2CH_2}{\overset{}{\diagdown}}N-R' \quad (II)$$

wherein R represents a lower alkyl radical and R' a radical $$-[(CH_2)_2-O]_x-(CH_2)_2-OH$$

wherein x represents the integers 1 and 2.

The invention also relates to the preparation of these products and their salts.

I have found that the products of this structure possess a great analgesic power which is several times that of "Pethidine" and approaches that of morphine. Moreover, these products have the advantage of being less toxic with equal activity and they do not produce the unpleasant secondary effects which are observed with the known analgesics.

It was quite impossible to foresee that the simple substitution of the methyl group of "Pethidine" by an aliphatic radical containing an ether function could increase the analgesic activity in such proportions.

These products have not only a greater analgesic activity than "Pethidine," but they have also a low toxicity and a low depressive activity on the respiration.

Thus, comparative pharmacological experiments carried out on rats, with one of the products of the invention, namely 1 - [2 - (2 - hydroxyethoxy) - ethyl] - 4 - phenyl-4 - carbethoxy - piperidine (product A), and with Pethidine and morphine have shown that the product of the invention possesses twice the activity of morphine. The results of these experiments are reproduced in the following table, in which the figures correspond to the number of milligrammes per kilogramme of animal (rat) necessary for producing the analgesic action and to the lethal dose:

| | Product A | Pethidine | Morphine |
|---|---|---|---|
| Activity by subcutaneous injection in rats | 1 | 25 | 2 |
| Activity with buccal administration in rats | 8 | 50 | 8 |
| Toxicity per os | 200 | 100 | ±500 |
| Toxicity with subcutaneous injection | 300 | 600 | ±400 |

According to the invention, the preparation of the products is carried out:

By reacting a 4-phenyl-4-carbalkoxy-piperidine with a halogenated derivative of the formula $$Hal-(CH_2)_2-O-(CH_2)_2-OH$$

wherein Hal represents a halogen atom,

By treating a 4-phenyl-4-carbalkoxy-piperidine with a halogenated derivative of the formula $$Hal-(CH_2)_2-O-(CH_2)_2-O-(CH_2)_2-OH$$

wherein Hal represents a halogen atom,

By reacting ethylene oxide with a 4-phenyl-4-carbalkoxy-piperidine,

By reacting ethylene oxide with a 1-(2-hydroxyethyl)-4-phenyl-4-carbalkoxy-piperidine, By reacting ethylene oxide with 1-[2-(2-hydroxyethoxy)-ethyl]-4-phenyl-4-carbalkoxy-piperidine.

*Example 1.—Preparation of 1-[2-(2-hydroxyethoxy)-ethyl]-4-phenyl-4-carbethoxy-piperidine*

$$OH-(CH_2)_2-O-(CH_2)_2-N\underset{CH_2CH_2}{\overset{CH_2CH_2}{\diagdown}}C\underset{C_6H_5}{\overset{COOC_2H_5}{\diagup}}$$

A solution of 34.5 g. of 4-phenyl-4-carbethoxy-piperidine, 50 g. of 2-(2-chlorethoxy)-ethanol and 30 cc. of triethylamine is heated at 60° C. with agitation for 30 hours.

After cooling, 50 cc. of benzene are added, the mixture is filtered off and the filtrate is extracted with dilute hydrochloric acid. The acid solution is made alkaline by a sodium hydroxide solution and the basic products thus liberated are extracted with benzene. The benzene solution is dried over sodium hydroxide and the solvent is evaporated. The residue is carefully rectified in vacuo. 9.8 g. of unconverted 4-phenyl-4-carbethoxy-piperidine are first obtained, and then 28 g. of 1-[2-(2-hydroxyethoxy)-ethyl]-4-phenyl-4-carbethoxy-piperidine.

B. P. of the base: 170° C./0.02 mm. Hg.

The corresponding hydrochloride is prepared by treating an alcoholic solution of the base with a slight excess of an ethereal hydrochloric acid solution. The hydrochloride crystallizes from a mixture of alcohol and ether.

M. P. of the hydrochloride: 115° C.

*Example 2.—Preparation of 1-{2-[2-(2-hydroxyethoxy)-ethoxy]-ethyl}-4-phenyl-4-carbethoxy-piperidine*

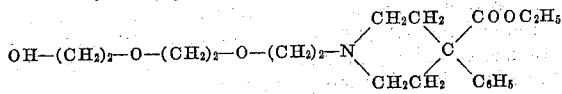

A solution of 16.7 g. of 4-phenyl-4-carbethoxy-piperidine, 15 cc. of triethylamine, 100 cc. of anhydrous toluene and 12.2 g. of 2-[2-(2-hydroxyethoxy)-ethoxy]-1-chloro-ethane is heated in an autoclave at 150° C. for 20 hours.

The preparation is completed by the method described in Example 1 and there is finally obtained 1-{2-[2-(2-hydroxyethoxy) - ethoxy] - ethyl} - 4 - phenyl - 4 - carbethoxy-piperidine in a yield of 60%.

B. P. of the base: 205° C./0.01 mm. Hg.

The corresponding hydrochloride is prepared by the process described in Example 1.

*Example 3.—Preparation of 1-[2-(2-hydroxyethoxy)-ethyl]-4-phenyl-4-carbethoxy-piperidine*

To 27.7 g. of 1-(2-hydroxyethyl)-4-phenyl-4-carbethoxy-piperidine dissolved in 30 cc. of ether are added 4.8 g. (10% excess) of ethylene oxide dissolved in 10 cc. of ether. The whole is heated for 5 hours in an autoclave at 100–125° C. The product of the reaction is distilled in vacuo.

Distilling under a pressure of 0.02 mm. Hg, there are obtained, at 170° C., 8.5 g. of 1-[2-(2-hydroxyethoxy)-ethyl]-4-phenyl-4-carbethoxy-piperidine similar to that obtained in Example 1.

Under the same pressure (0.02 mm. Hg) there are further obtained, at about 197–198° C., 2.6 g. of 1-{2-[2-(2 - hydroxyethoxy) - ethoxy] - ethyl} - 4 - phenyl - 4 - carbethoxy-piperidine, similar to that obtained in Example 2.

I claim:

1. A member selected from the group consisting of, piperidine derivatives of the general formula

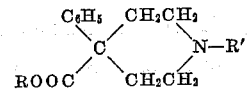

wherein R represents a lower alkyl radical and R' a radical —[(CH$_2$)$_2$—O]$_x$—(CH$_2$)$_2$—OH wherein $x$ represents the integers 1 and 2, and their hydrochlorides.

2. As a new piperidine derivative, 1-[2-(2-hydroxyethoxy)-ethyl]-4-phenyl-4-carbethoxy-piperidine.

3. As a new piperidine derivative, 1-{2-[2-(2-hydroxyethoxy) - ethoxy] - ethyl} - 4 - phenyl - 4 - carbethoxy-piperidine.

References Cited in the file of this patent

Elpern: (Abst. Papers, 130th Meeting of Am. Chem. Soc., September 1956, 7N, No. 11).